(12) United States Patent
Sugie et al.

(10) Patent No.: US 8,071,239 B2
(45) Date of Patent: Dec. 6, 2011

(54) LONG LIFE AND LOW CORROSION LEAD STORAGE BATTERY

(75) Inventors: Kazuhiro Sugie, Shizuoka (JP); Kazuhiko Shimoda, Shizuoka (JP); Shozo Murochi, Aichi (JP); Tsunenori Yoshimura, Shizuoka (JP); Shinichi Iwasaki, Shizuoka (JP); Shoji Horie, Shizuoka (JP); Michio Kurematsu, Shizuoka (JP); Koichi Yonemura, Kyoto (JP)

(73) Assignee: Panasonic Corporation, Osaka (JP)

( * ) Notice: Subject to any disclaimer, the term of this patent is extended or adjusted under 35 U.S.C. 154(b) by 1194 days.

(21) Appl. No.: 10/587,186

(22) PCT Filed: Apr. 7, 2005

(86) PCT No.: PCT/JP2005/006869
§ 371 (c)(1),
(2), (4) Date: Jul. 25, 2006

(87) PCT Pub. No.: WO2005/099020
PCT Pub. Date: Oct. 20, 2005

(65) Prior Publication Data
US 2007/0160903 A1    Jul. 12, 2007

(30) Foreign Application Priority Data

Apr. 8, 2004 (JP) ................ 2004-113827
May 12, 2004 (JP) ................ 2004-142041
Dec. 3, 2004 (JP) ................ 2004-350913
Dec. 3, 2004 (JP) ................ 2004-350914

(51) Int. Cl.
*H01M 2/16* (2006.01)
*H01M 10/00* (2006.01)
*H01M 4/72* (2006.01)
*H01M 4/68* (2006.01)

(52) U.S. Cl. ..... 429/248; 429/122; 429/209; 429/218.1; 429/233; 429/245; 429/247

(58) Field of Classification Search .............. None
See application file for complete search history.

(56) References Cited

U.S. PATENT DOCUMENTS
5,989,750 A * 11/1999 Ohba et al. ............. 429/251

FOREIGN PATENT DOCUMENTS
JP          2-262258 A      10/1990
(Continued)

OTHER PUBLICATIONS
AIPN Machine translation of JP 2003-346888, Yonemura, Dec. 5, 2003.*
(Continued)

*Primary Examiner* — Barbara Gilliam
*Assistant Examiner* — Kwang Han
(74) *Attorney, Agent, or Firm* — McDermott Will & Emery LLP

(57) ABSTRACT

A lead storage battery of the present invention has an electrode plate pack including: a plurality of negative electrode plates in each of which a negative electrode active material layer is retained by a negative electrode grid, a plurality of positive electrode plates in each of which a positive electrode active material layer is retained by a positive electrode grid, and a plurality of separators separating the positive and negative electrode plate; a positive electrode connecting member connected to each positive electrode plate of the electrode plate pack; and a negative electrode connecting member connected to each negative electrode plate of the electrode plate pack. The positive and negative electrode grids, and the positive and negative electrode connecting members comprise a Pb alloy including at least one of Ca and Sn, the negative electrode grid further includes Sb in a part thereof excluding the tab part, and the separator includes silica.

10 Claims, 6 Drawing Sheets

FOREIGN PATENT DOCUMENTS

| | | |
|---|---|---|
| JP | 3-37962 | 2/1991 |
| JP | 4-32165 A | 2/1992 |
| JP | 8-69811 A | 3/1996 |
| JP | 2001-291527 A | 10/2001 |
| JP | 2002-164080 A | 6/2002 |
| JP | 2003-142147 A | 5/2003 |
| JP | 2003-346888 A | 12/2003 |
| WO | WO 02/095846 A1 | 11/2002 |

OTHER PUBLICATIONS

European Search Report, issued in corresponding European Patent Application No. 05728390.5-1227, dated on May 25, 2007.

* cited by examiner

LONG LIFE AND LOW CORROSION LEAD STORAGE BATTERY

RELATED APPLICATIONS

This application is the U.S. National Phase under 35 U.S.C. §371 of International Application No. PCT/JP2005/006869, filed on Apr. 7, 2005, which in turn claims the benefit of Japanese Application Nos. 2004-113827, 2004-142041, 2004-350913 and 2004-350914 filed on Apr. 8, 2004, May 12, 2004, Dec. 3, 2004 and Dec. 3, 2004, respectively, the disclosures of which Applications are incorporated by reference herein.

TECHNICAL FIELD

The present invention relates to a lead storage battery. More particularly, the present invention relates to an improvement of service life properties of a lead storage battery used for vehicles carrying a stop-and-go-system.

BACKGROUND ART

Conventionally, a lead storage battery has been used for starting an engine of a vehicle and for a back-up power source. Among these usages, a lead storage battery for starting an engine functions to supply electricity to various electric and electronic devices mounted on vehicles, in addition to a cell motor for starting an engine. After starting an engine, a lead storage battery is charged by an alternator. An output voltage and an output current of the alternator are set so that SOC (state of charge) of the lead storage battery is maintained to be 90 to 100%.

In recent years, a demand for an improvement of a fuel-efficiency of a vehicle is increasing, in view of environmental conservation. For such a demand, a vehicle carrying a stop-and-go-system and a regenerative-braking-system has been considered, for example. In the stop-and-go-system, an engine is stopped while the vehicle is idling, and in the regenerative-braking-system, a kinetic energy of a vehicle at the time of deceleration is converted to an electric energy, and the electric energy is stored.

In a vehicle carrying the stop-and-go-system, the lead storage battery is not charged when the vehicle is stopped in an idle stop mode. The lead storage battery sometimes supplies electric power to devices mounted on the vehicle while in such a state. Thus, in comparison with a conventional lead storage battery for starting engines, SOC of the lead storage battery inevitably becomes low. In a vehicle carrying the regenerative-braking-system, SOC of the lead storage battery has to be controlled to be lower, to about 50 to 90%, since electric energy is stored by the lead storage battery at the time of regeneration (deceleration).

In any of these systems, charge and discharge (hereinafter referred to as charge/discharge) are repeated frequently with a lower SOC domain than ever. Further, based on an increase in a dark current accompanied with vehicle parts increasingly becoming electrically powered, a discharge of the lead storage battery advances while a vehicle is stopped for a long period of time, thereby leaving a possibility for an over discharge.

Therefore, for a lead storage battery to be used in vehicles carrying these systems, service life properties under a usage mode in which charge/discharge is repeated frequently with a lower SOC domain needs to be improved.

For deterioration factors of a lead storage battery under such usage mode, an insufficient charge due to decline in chargeability of the lead storage battery can be mentioned, mainly. Since a charge system of a vehicle is based on constant voltage control, when chargeability of a negative electrode plate is reduced, a potential of negative electrode decreases at an initial stage of charge and a voltage rapidly rises up to a preset voltage value, and a current decreases sooner. Thus, a sufficient amount of charged electricity of a lead storage battery can not be secured, thereby rendering the battery to be in an undercharged state.

For suppressing such deterioration, there has been proposed a method in which a lead alloy layer containing Sn and Sb is formed on a surface of a positive electrode grid of a Pb—Ca—Sn alloy, for example (Patent Document 1). The formation of such layer will suppress a deterioration of positive electrode active material and a formation of a passivated layer at an interface between a positive electrode active material and a positive electrode grid.

Also, a part of Sb which exists on a surface of a positive electrode grid dissolves in an electrolyte, and deposits on a negative electrode plate. The deposited Sb on a negative electrode active material will raise a charging potential of a negative electrode plate, and a charging voltage will lower down, thereby improving chargeability of a lead storage battery. As a result, deterioration of a lead storage battery due to insufficient charge during charge/discharge cycle is suppressed.

This method is very effective in an engine starting lead storage battery which is used while SOC is over 90%, and service life properties will drastically improve.

However, when a lead storage battery is to be used in a vehicle equipped with the above stop-and-go-system or the regenerative-braking-system, that is, when a lead storage battery is to be used in a mode in which charge/discharge is repeated under lower range of SOC, there was a problem in that a corrosion easily advances in a tab of negative electrode grid, while the chargeability can be secured. When the corrosion advances in a tab of negative electrode grid, current collecting efficiency of a negative electrode plate declines due to a decrease in a thickness of the tab, thereby shortening its service life.

The decrease in a thickness of the tab of negative electrode grid also weakens intensity of the tab, in addition to the decline in the current collecting efficiency. Especially, in batteries mounted on vehicles, since vibrations and impacts are constantly applied to the batteries while traveling, deformations of a tab of negative electrode grid cause a negative electrode plate to become out of position, leaving a possibility for an occurrence of an internal short-circuit by a negative electrode plate making contact with a positive electrode plate.

Conventionally, regarding the corrosion of a tab of negative electrode grid, it has been known that by an exposure of a negative electrode strap and a tab of negative electrode grid from an electrolyte to oxygen in air, a welded part of the strap and the tab is corroded to cause a disconnection. However, although a negative electrode strap and a tab of negative electrode grid are being immersed in the electrolyte, the tab of negative electrode grid is easily being corroded when Sb is deposited in a very small amount on a surface of the tab of negative electrode grid by dissolution of Sb included in a positive electrode grid, and in a positive electrode connecting member comprising a positive electrode strap, a positive electrode pole, and a positive electrode connecting body into an electrolyte.

In Patent Document 2, there has been proposed a lead storage battery in which a positive electrode grid, a positive electrode connecting member, a tab of negative electrode grid, and a negative electrode connecting member are formed from Pb or a Pb-alloy not including Sb, and a very small amount of Sb is included in either one of a negative electrode grid excluding a tab-part or a negative electrode active material layer to a degree that would not increase an amount of electrolyte loss. Based on such structure, it has been shown that chargeability and service life for a deep discharge of a battery are improved to a certain extent, by suppressing the dissolution of Sb existing in a positive electrode plate into an electrolyte and deposition of Sb on a tab of negative electrode grid.

However, the above lead storage battery as well had a problem in that under a usage mode where a charge/discharge is repeated frequently while SOC is in a low range, a tab of negative electrode-grid is corroded by the dissolution of Sb in a negative electrode grid excluding a tab part into an electrolyte, and by a deposition of Sb on a tab of negative electrode grid.

Patent Document 1: Japanese Laid-Open Patent Publication No. Hei 03-37962
Patent Document 2: Japanese Laid-Open Patent Publication No. 2003-346888

DISCLOSURE OF INVENTION

Problem that the Invention is to Solve

Thus, an object of the present invention is to provide a lead storage battery with a longer service life and high reliability under a usage mode where a charge/discharge is repeated frequently while SOC is in a low range, by improving chargeability and suppressing a corrosion of a tab of negative electrode grid.

Means for Solving the Problem

The present invention is a lead storage battery including:
an electrode plate pack comprising a plurality of negative electrode plates which each comprise a negative electrode grid having a tab and a negative electrode active material layer retained by the negative electrode grid, a plurality of positive electrode plates which each comprise a positive electrode grid having a tab and a positive electrode active material layer retained by the positive electrode grid, and a plurality of separators separating the positive electrode plate and the negative electrode plate;
a positive electrode connecting member comprising a positive electrode strap to which the tab of each positive electrode plate of the electrode plate pack is connected, and a positive electrode pole or a positive electrode connecting body provided at the positive electrode strap; and
a negative electrode connecting member comprising a negative electrode strap to which the tab of each negative electrode plate of the electrode plate pack is connected, and a negative electrode pole or a negative electrode connecting body provided at the negative electrode strap.

The positive electrode grid, the negative electrode grid, the positive electrode connecting member, and the negative electrode connecting member comprise a Pb-alloy including at least one of Ca and Sn,
the negative electrode grid excluding the tab part further includes Sb, and
the separator includes silica.

In a first preferred embodiment of the separator, the separator comprises a microporous synthetic resin sheet and silica particles dispersed in the synthetic resin sheet, and includes 40 to 85% by mass of the silica particles.

In a second preferred embodiment of the separator, the separator comprises a fiber mat and silica particles retained by the fiber mat, and includes 10 to 40% by mass of the silica particles.

It is preferable that in the negative electrode plate, the negative electrode grid includes 0.0002 to 0.006 parts by mass of the Sb per 100 parts by mass of the negative electrode active material.

It is preferable that the negative electrode grid comprises a base material layer comprising a Pb-alloy including at least one of the Ca and Sn, and a lead alloy layer including the Sb formed on at least a part of the base material layer.

It is preferable that the lead alloy layer including Sb is formed on a lower region of the negative electrode plate.

It is preferable that the positive electrode grid comprises a base material layer comprising a Pb-alloy including at least one of Ca and Sn, and a lead alloy layer including Sn formed on at least a part of the base material layer.

It is preferable that the separator is a bag-shaped, and accommodates the negative electrode plate.

Effects of the Invention

According to the present invention, a lead storage battery with a longer service life and high reliability can be obtained even under a usage mode in which charge/discharge is frequently repeated under a comparatively low range of SOC, since chargeability is improved, and corrosion of a tab of negative electrode grid is suppressed. Also, although there is a possibility for the battery to be in an over-discharge state under such usage mode, corrosion of a tab of negative electrode grid can be suppressed even under the over-discharge state.

BEST MODE FOR CARRYING OUT THE INVENTION

The present invention relates to a lead storage battery for vehicles carrying a stop-and-go-system and a regenerative-braking-system. In the present invention, a Pb-alloy substantially not including Sb which advances corrosion of a tab of negative electrode grid is used for a positive electrode grid, a positive electrode connecting member, a tab of negative electrode grid, and a negative electrode connecting member. Sb is added to a negative electrode grid excluding the tab part, i.e., an expanded mesh and frame. And silica is to be contained in a separator. Based on such battery, a service life of the battery can be extended significantly for a usage mode of the above systems which repeat charge/discharge frequently under a low SOC range.

Figure 1:
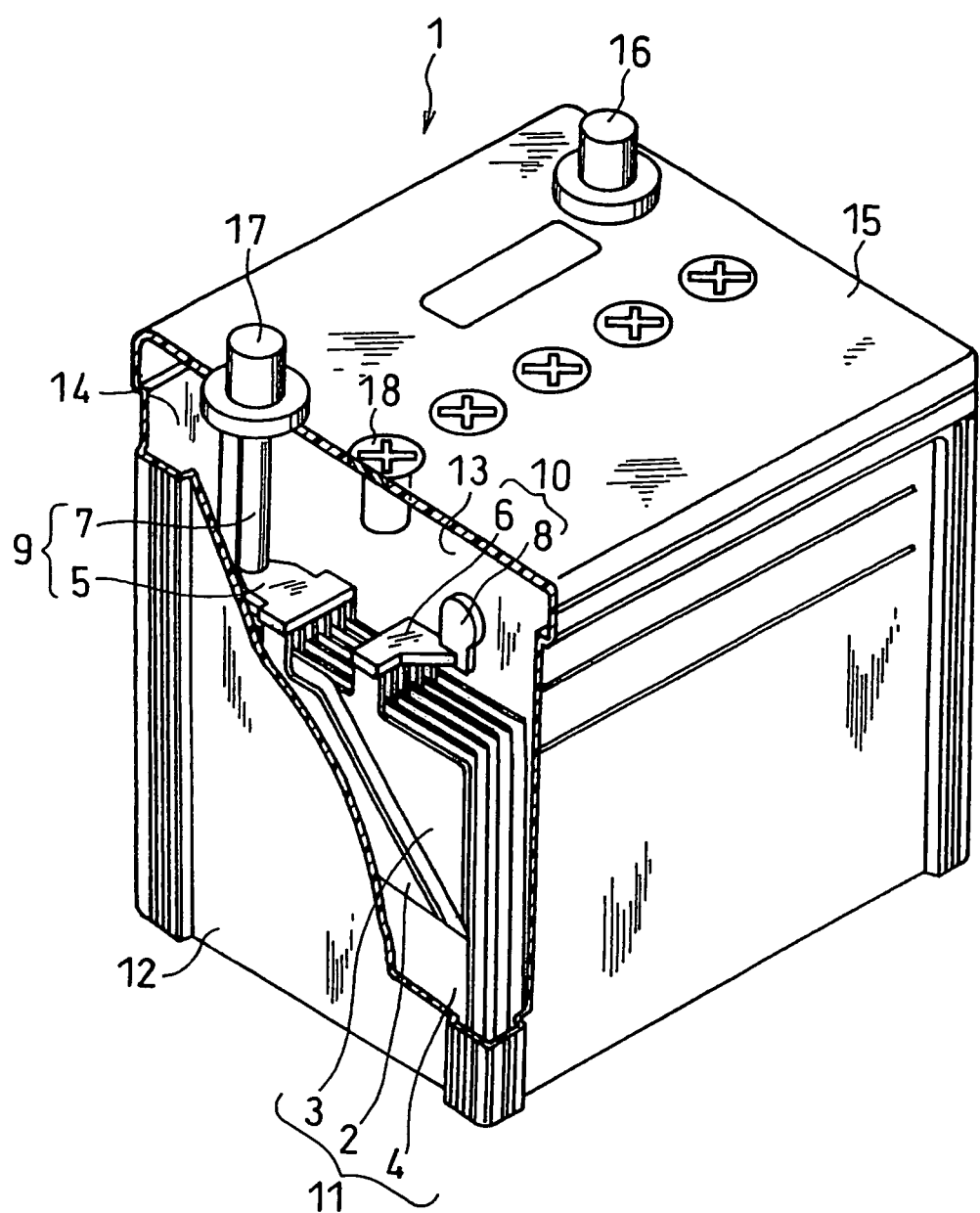
FIG. 1 A partially cut away perspective view of a lead storage battery of an example of the present invention.

In the following, embodiments of the present invention are explained in detail. FIG. 1 is a partially cut away perspective view of a lead storage battery of the present invention.

A battery container 12 of a lead storage battery 1 is divided by partition 13 to have a plurality of cell chambers 14, and an electrode plate pack 11 is stored in each cell chamber 14. The electrode plate pack 11 is structured by stacking up a plurality of positive electrode plates 3 and negative electrode plates 2 interposing a separator 4 in between a respective pair of positive and negative electrode plates. The positive electrode plate 3 is connected to a positive electrode connecting member 10, and the negative electrode plate 2 is connected to a negative electrode connecting member 9.

In the electrode plate pack 11, a tab 32 of positive electrode grid of the positive electrode plate 3 is connected to a positive electrode strap 6, and a tab 22 of negative electrode grid of the negative electrode plate 2 is connected to a negative electrode strap 5. A positive electrode connecting body 8 connected to the positive electrode strap 6 of the electrode plate pack 11 in one cell chamber 14 is connected with a negative electrode connecting body connected with a negative electrode strap of an electrode plate pack 11 inside of adjacent cell chamber 14 via a through hole provided in the partition 13. Thus, one electrode plate pack 11 is connected with another electrode plate pack 11 in adjacent cell chamber 14 in series. A positive electrode pole is formed on a positive electrode strap at one end of the battery container 12, and a negative electrode pole 7 is formed on the negative electrode strap 5 on another end of the battery container 12.

Thus, the positive electrode connecting member 10 comprises the positive electrode strap 6 to which the tab 32 of positive electrode grid is connected, and the positive electrode pole or the positive electrode connecting body 8 provided on the positive electrode strap 6; and the negative electrode connecting member 9 comprises the negative electrode strap 5 to which the tab 22 of negative electrode grid is connected, and the negative electrode pole 7 or the negative electrode connecting body provided on the negative electrode strap 5.

A lid 15 provided with a positive electrode terminal 16 and a negative electrode terminal 17 is attached to an opening of the battery container 12. The positive electrode pole and the negative electrode pole are respectively connected to the positive electrode terminal 16 and the negative electrode terminal 17. In a liquid inlet provided on the lid 15, a vent cap 18 having an opening for ventilation to eject a gas generated inside of the battery to the outside of the battery is attached.

Figure 2:
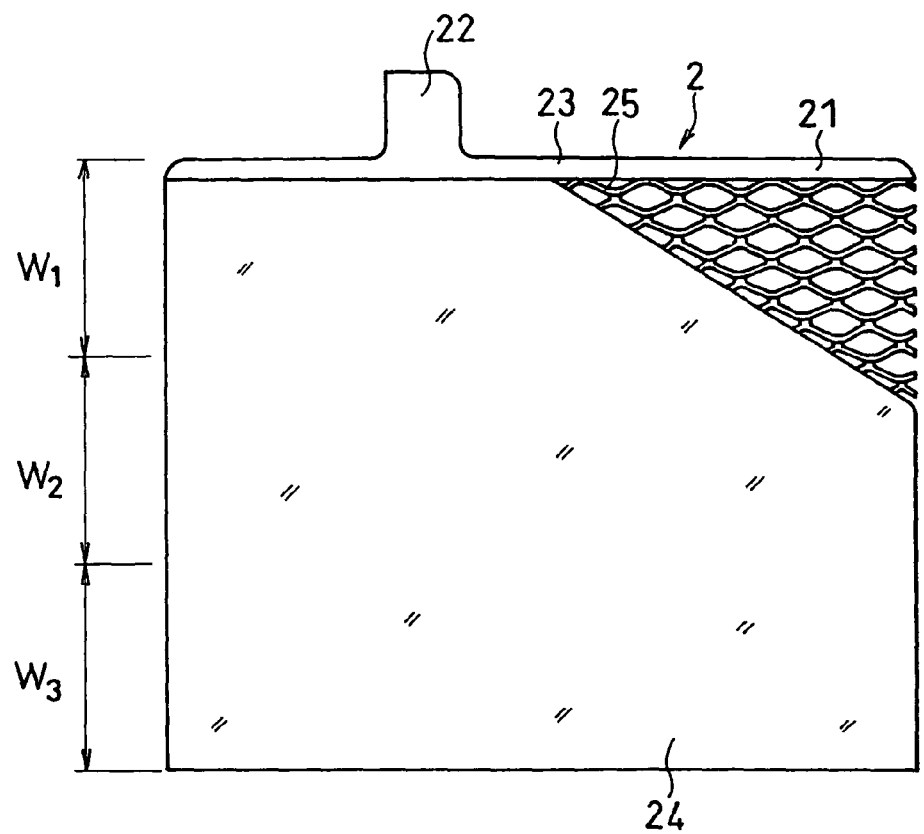
FIG. 2 A front view of a negative electrode plate of the same lead storage battery.

A front view of a negative electrode plate 2 is illustrated in FIG. 2.

A negative electrode plate 2 comprises a negative electrode grid 21 having a tab 22 and a negative electrode active material layer 24 retained by the negative electrode grid 21. The negative electrode active material layer 24 mainly comprises a negative electrode active material (Pb), and other than the negative electrode active material, the negative electrode active material layer 24 may include a small amount of an expander such as lignin and barium sulfate, a conductive material such as a carbon, and a binder, for example. The negative electrode grid 21 is an expanded grid comprising an expanded mesh 25 retaining the negative electrode active material layer 24, a frame 23 provided on an upper edge of the expanded mesh 25, and the tab 22 connected to the frame 23.

The negative electrode grid 21 and a negative electrode connecting member 9 basically comprise a Pb-alloy including at least one of Ca and Sn. For the Pb-alloy, a Pb—Sn alloy including 0.05 to 3.0% by mass of Sn, a Pb—Ca alloy including 0.01 to 0.10% by mass of Ca, or a Pb—Ca—Sn alloy including Ca and Sn may be used, in terms of corrosion resistance and mechanical strength.

The Pb alloy including at least one of Ca and Sn does not include Sb substantially. However, Sb in a very small amount of approximately below 0.0001% by mass may be included as impurity in the Pb-alloy. Also, pure Pb may be used for the negative electrode grid 21 and the negative electrode connecting member 9, because in the negative electrode plate 2, a resistance to oxidation are not required compared with the positive electrode 3.

The negative electrode grid 21 further includes Sb in a part excluding the tab 22, i.e., in the expanded mesh 25 and the frame 23. By including Sb which is low in hydrogen overvoltage in the negative electrode grid excluding the tab part, a charge potential of the negative electrode plate increases, thereby significantly improving chargeability of the negative electrode. The lead storage battery of the present invention is structured to include Sb only in a part of the negative electrode grid excluding the tab part.

Especially, in the negative electrode plate, when Sb content of the negative electrode grid is not less than 0.0002 parts by mass per 100 parts by mass of the negative electrode active material, service life properties are improved. Further, when Sb content of the negative electrode grid is not less than 0.0004 parts by mass per 100 parts by mass of the negative electrode active material, service life properties are improved significantly. On the other hand, when Sb content of the negative electrode grid is over 0.006 parts by mass per 100 parts by mass of the negative electrode active material, corrosion of the tab of negative electrode grid advances gradually. Thus, it is preferable that Sb content in the negative electrode grid is 0.0002 to 0.006 parts by mass per 100 parts by mass of the negative electrode active material. It is further preferable that Sb content of the negative electrode grid is 0.0004 to 0.006 parts by mass per 100 parts by mass of the negative electrode active material.

It is preferable that in the negative electrode grid including Sb in a part excluding the tab, an entire negative electrode grid including the tab is formed of a base material layer comprising the Pb-alloy not including Sb as in the positive electrode grid above, i.e., the Pb-alloy including at least one of Ca and Sn, and the lead alloy layer including Sb is formed on at least a part of a surface of the base material layer excluding the tab part.

When Sb is added in a Pb—Ca alloy, there may be a case when an intermetallic compound of Ca and Sb is generated in the alloy. The negative electrode grid easily becomes corroded when such alloy is used for the negative electrode grid and the intermetallic compound of Ca and Sb contacts with sulfuric acid. Therefore, when the Pb—Ca alloy is used for the negative electrode grid, a generation of an intermetallic compound of Ca and Sb can be prevented by using Pb—Ca alloy for the base material layer, and the Pb—Sb alloy for the lead alloy layer, as in the above.

The negative electrode grid comprising the base material layer and the lead alloy layer above can be made by the following method, for example.

A base material sheet comprising a Pb alloy including at least one of Ca and Sn, and a lead alloy foil including Sb are supplied in between a pair of rollers and the lead alloy foil is pressed to attach onto the base material sheet, thereby obtaining a composite sheet comprising a base material layer and a lead alloy layer. At this time, the lead foil is pressed to attach onto a part of the base material sheet where an expanded mesh and a frame are formed (excluding a part where a tab is formed) by an expanding process mentioned later, thereby obtaining a negative electrode grid (expanded grid). It is preferable that a thickness of the base material layer in the composite sheet is 0.5 to 1.3 mm, and a thickness of the lead alloy layer is 0.1 to 20 μm.

As for the other method to obtain the composite sheet, a method by thermally spraying a lead alloy including Sb onto a surface of the base material sheet can be mentioned.

For the negative electrode grid, a cast grid may be used, other than the expanded grid above. The cast grid may be obtained by punching the composite sheet above.

The method to integrate the lead alloy foil and the base material sheet by pressing and attaching each other is extremely preferable in that generation of an intermetallic compound of Sb and Ca which causes corrosion can be suppressed, since Sb in the lead alloy foil and Ca in the base material sheet are not melted and mixed together. Also, the method is preferable in that the method can be conducted more easily and conveniently without a significant change in manufacturing process, compared with the method for forming a lead alloy layer by thermal spraying.

It is preferable that the lead alloy foil including Sb further includes Sn. This improves mechanical strength, and prevents a cut of the lead alloy foil during the manufacturing process. Since this causes an improvement of a tensile strength of the lead alloy foil, a meandering of the lead alloy foil at the time of pressing on the base material sheet can be suppressed, and a dimensional precision can be secured.

It is preferable that the lead alloy layer including Sb above is formed on a lower region of the negative electrode plate in the gravity direction, i.e., a lower part of the region structuring the expanded mesh of negative electrode grid. When charge/discharge is repeated under a lower SOC range, a stratification occurs in which a concentration of sulfuric acid in the electrolyte becomes higher in a lower region in the gravity direction, and becomes lower in the upper part in the gravity direction. Then, lead sulfate tends to accumulate in a lower part of a positive electrode plate and a negative electrode plate where the concentration of sulfuric acid is high, thereby inducing deterioration of service life properties. Such accumulation of lead sulfate is notable especially in a negative electrode plate.

To counter this, by including the lead alloy layer having Sb in the negative electrode grid at a lower part of the negative electrode plate, generation of hydrogen gas at a lower part of the electrode plate becomes notable, as described above. The occurrence of the stratification is suppressed and service life properties are improved, due to the stirring of the electrolyte based on the generation of hydrogen gas.

The effect of Sb can be obtained by structuring the negative electrode active material layer to have Sb, other than structuring the part of the negative electrode grid excluding tab to include Sb. However, the structure in which Sb is included in the part of the negative electrode grid excluding tab is more effective in following points.

The negative electrode active material layer including Sb can be obtained by adding Sb or antimony sulfate at the time of kneading a negative material paste. In manufacturing a lead storage battery, various kinds of negative electrode pastes are kneaded by a kneader, generally. In such case, Sb in the negative electrode paste possibly remains in the kneader to be mixed into other kind of negative material paste designed not to include Sb.

Also, in manufacturing steps of a lead storage battery, water used for cleaning the kneader, and waste of the paste generated in a filling process of the negative electrode paste in the negative electrode grid are collected to recycle them as a negative electrode paste by adjusting its amount of water, generally. Therefore, when the negative electrode paste including Sb and the negative electrode paste not including Sb are to be manufactured, waste of the paste including Sb and waste of the paste not including Sb have to be collected separately for the recycle. Thus, facilities and process management become complicated. As opposed to this, in the structure of the present invention, which includes Sb only in the negative electrode grid, the above problem will not occur: therefore, it is preferable in terms of facility cost and process management.

Figure 3:
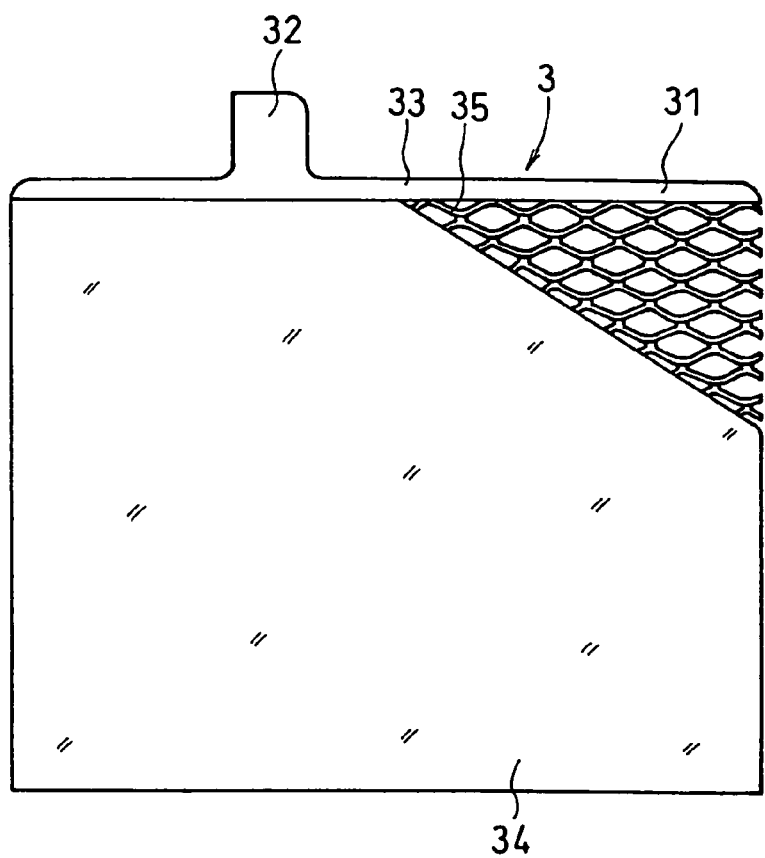
FIG. 3 A front view of a positive electrode plate of the same lead storage battery.

A front view of a positive electrode plate 3 is shown in FIG. 3.

A positive electrode plate 3 comprises a positive electrode grid 31 having a tab 32, and a positive electrode active material layer 34 retained by the positive electrode grid 31. The positive electrode active material layer 34 mainly comprises a positive electrode active material ($PbO_2$), and may include, other than the positive electrode active material, a small amount of a conductive material such as a carbon and the like, or a binder. The positive electrode grid 31 is an expanded grid comprising an expanded mesh 35 in which the positive electrode active material layer 34 is retained, a frame 33 provided on an upper edge of the expanded mesh 35, and the tab 32 connected to the frame 33.

The positive electrode grid 31 and a positive electrode connecting member 10 comprise a Pb-alloy including at least one of Ca and Sn.

For the Pb alloy, a Pb—Sn alloy including 0.05 to 3.0% by mass of Sn, a Pb—Ca alloy including 0.01 to 0.10% by mass of Ca, or a Pb—Ca—Sn alloy including Ca and Sn may be used, in view of corrosion resistance and mechanical strength.

The Pb alloy including at least one of Ca and Sn used for the positive electrode grid and positive electrode connecting member does not substantially include Sb. However, Sb in an amount of about 0.001 to 0.002% by mass may be included in the lead alloy as impurity to an extent which will not give an adverse effect to battery performance due to increases of electrolyte reduction amount and self-discharging amount.

Also, in order to improve corrosion resistance of the positive electrode grid, the lead alloy of the positive electrode grid body may include 0.01 to 0.08% by mass of Ba and 0.001 to 0.05% by mass of Ag. When the lead alloy including Ca is to be used, about 0.001 to 0.05% by mass of Al may be added in order to suppress oxidation and dissipation of Ca from molten lead alloy. Also, 0.0005 to 0.005% by mass of Bi may be included as an impurity. This is not detrimental to the effect of the present invention, and is acceptable.

The positive electrode plate 3 and the negative electrode plate 2 may be obtained by a method illustrated below.

An unformed positive electrode plate can be obtained by filling a positive electrode paste, in which a raw material lead powder (a mixture of lead and lead oxide), sulfuric acid, water, and the like are mixed, into a positive electrode grid, and then curing and drying, for example.

Also, an unformed negative electrode plate can be obtained by filling a negative electrode paste, in which a raw material lead powder (lead and lead oxide), sulfuric acid, water, and an expander such as lignin and barium sulfate are mixed, into a negative electrode grid, and then curing and drying, for example. For the lignin, natural lignin (VANILLEX N manufactured by Nippon Paper Chemicals, for example) and synthetic lignin such as a condensed bisphenol-sulfonate (VISPERSE P215 manufactured by Nippon Paper Chemicals, for example) and the like are used, for example.

Then, the above positive electrode plate 3 and negative electrode plate 2 are obtained by forming the unformed positive and negative electrode plates. The forming may be conducted within a battery container of a lead storage battery made by using unformed positive and negative electrode plates, or may be conducted before composing an electrode plate pack at the time of producing a lead storage battery.

The separator 4 includes silica ($SiO_2$).

In a lead storage battery of the present invention, it is assumed that a battery is over-discharged, and that charge/discharge is frequently repeated under a low SOC range, as in the above. Under such usage mode, corrosion of the tab of negative electrode grid can not be sufficiently suppressed, just by limiting the addition of Sb only to the negative electrode grid excluding the tab.

For such a problem, by including silica in a separator, corrosion of the tab of negative electrode grid due to a deposit of Sb at the tab of negative electrode grid can be suppressed, because the silica in the separator adsorbs Sb, even Sb is dissolved from the negative electrode grid excluding the tab under such usage mode.

Thus, service life properties of a lead storage battery in the above usage mode will be drastically-improved, since the inclusion of Sb in the negative electrode plate improves chargeability, and the inclusion of silica in the separator suppresses corrosion of the tab of negative electrode grid.

In a first preferred embodiment of the separator 4, the separator comprises a microporous synthetic resin sheet and silica particles dispersed in the synthetic resin sheet, and the content of the silica particles in the separator is 40 to 85% by mass. When the content of silica particles in the separator comprising the synthetic resin sheet including silica particles is less than 40% by mass, the effect to suppress the corrosion of the tab of negative electrode grid slightly decreases. On the other hand, when the content of silica particles in the separator comprising the synthetic resin sheet including silica particles is over 85% by mass, the separator is weakened and becomes prone to crack and create holes, thereby easily inducing an internal short circuit of the battery.

Since a notable effect to suppress corrosion of the tab of negative electrode grid can be obtained, as well as an effect to improve service life properties, it is preferable that the content of silica particles in the separator comprising synthetic resin sheet including silica particles is 40 to 65% by mass.

For the synthetic resin sheet, polyethylene and polypropylene can be mentioned, for example. Carbon may be included in the synthetic resin sheet, in order to improve ion conductivity.

For silica particles, it is preferable that a porous silica having fine pores of an average pore diameter of not more than 20 µm, for example, is used, in order to easily adsorb Sb on a surface thereof. Also, it is preferable that a porous silica having a large specific surface area of approximately 200 $m^2/g$ is used. It is preferable that a particle diameter of the silica particles is 5 to 40 µm.

The microporous synthetic resin sheet has electrolyte-permeable fine pores with a pore diameter of approximately 0.01 to 1 µm. When the diameter of the pore is over 1 µm, an active material easily passes through the separator. Such separator can be obtained by adding silica particles at the time of producing the microporous sheet comprising synthetic resin, for example.

In a second preferred embodiment of the separator 4, the separator comprises a fiber mat and silica particles retained by the fiber mat, and contents of silica particles in the separator is 10 to 40% by mass. When the contents of silica particles in the separator comprising fiber mat retaining silica particles is less than 10% by mass, an effect to suppress corrosion of a tab of negative electrode grid slightly decreases. On the other hand, when the content of silica particles in the separator comprising fiber mat retaining silica particles is over 40% by mass, strength of a separator weakens due to a decrease in binding force of fibers, and a discharge voltage of a battery decreases due to an increase of internal resistance of a battery.

For the fiber, a glass fiber with a fiber diameter of 0.1 to 2 µm, or polypropylene resin fiber and the like with a fiber diameter of 1 to 10 µm is used, for example. Such separator can be obtained by adding silica particles in a process of paper-making at the time of producing a fiber mat, for example.

Each cell includes electrolyte. And a positive electrode strap, a negative electrode strap, and an electrode plate pack are entirely immersed in the electrolyte. Since the negative electrode plate and the negative electrode strap do not contact with air, these are not easily oxidized. The present invention is not applied to a valve regulated lead storage battery, since the negative electrode grid includes Sb which is lower in hydrogen overvoltage than Pb. When the present invention is applied to a valve regulated lead storage battery, based on a gas generation in small amount, an internal pressure of a battery increases, and the control valve stays open for a long period of time. As a result, air flows into the battery and a negative electrode plate becomes oxidized, thereby making a battery prone to deteriorate.

It is preferable that the positive electrode grid 31 comprises a base material layer comprising a lead alloy including at least one of Ca and Sn, and a lead alloy layer including Sn formed on at least a part of the base material layer. This lead alloy layer improves chargeability of a positive electrode plate after a deep discharge or an over-discharge, leading to an improvement of service life properties. Also, a formation of passivated layer between an interface of a positive electrode active material and a positive electrode grid can be suppressed.

When the base material layer includes Sn, it is preferable that Sn content in a lead alloy layer is more than Sn content in the base material layer. For example, when 1.6% by mass of Sn is included in the base material layer, it is preferable that the lead alloy layer includes at least not less than 1.6% by mass of Sn, and further preferably, Sn content in the lead alloy layer is 3.0 to 6.0% by mass. When Sn content in the lead alloy layer is less than in the base material layer, the effect of Sn noted above weakens, due to an existence of the lead alloy layer which is less in Sn content at an interface of the positive electrode grid and the positive electrode active material.

The positive electrode grid comprising the base material layer and the lead alloy layer including Sn can be obtained in the same manner as the manufacturing method of the negative electrode grid comprising the base material layer and the lead alloy layer including Sb. When the base material sheet and the lead alloy foil including Sn are to be pressed to attach each other, a preferable thickness of the base material layer is 0.7 to 1.3 mm, and the lead alloy layer is 1 to 20 µm, in the obtained composite sheet. The lead alloy layer including Sn can be formed on the tab part, by pressing the lead alloy foil to attach onto the entire base material sheet.

The separator 4 is a bag-shaped separator which is disposed to have an opening on the upper side, and the negative electrode plate 2 is stored so that the tab 22 of negative electrode grid is positioned to the opening side.

The bag-shaped separator can be obtained by folding a polyethylene sheet or glass fiber mat to two and welding the left and right edges by heat to create opening only on the upper part, for example.

Since the negative electrode plate is stored in the bag-shaped separator, even when Sb inside of the negative electrode grid excluding the tab part is dissolved into an electrolyte, corrosion of the tab of negative electrode grid due to a deposit of Sb at the tab of negative electrode grid can be suppressed, because the dissolved Sb is captured by the bag-shaped separator rapidly and securely.

It is preferable that the separator 4 is provided with a plurality of ribs which are lines in parallel to the vertical direction, on a side thereof facing the positive electrode plate, in order to suppress deterioration of the separator due to oxidation by directly contacting with the positive electrode active material comprising $PbO_2$ having a strong oxidizing effect. Materials having a resistance to oxidation are used for the ribs. Preferably, the same material with the separator is used.

Although in the above, the bag-shaped separator is structured to store the negative electrode plate, other than such a structure, a structure in which a polyethylene sheet or a glass fiber mat is folded to two (a letter-U shape) and a negative electrode plate is inserted in between may be used as well.

Examples of the present invention are described in the following in detail.

Example

Example 1

(1) Fabrication of a Bag-Shaped Separator

To a polyethylene with an average molecular weight of 8000000, silica particles, a mineral oil, and carbon powders are added and then kneaded. After molding the kneaded matter by extrusion, the mineral oil was removed by a solvent such as hexane, to obtain a polyethylene sheet including silica particles, having fine porous of a pore diameter not more than 1 μm, and having a thickness of 0.2 mm. The polyethylene sheet thus obtained was folded to two, and a bag-shaped separator with an opening only on an upper part was obtained by welding both of the end sides of the folded sheet with heat.

For the silica particles, porous particles (a particle diameter: 20 μm) having fine pores with an average pore diameter of not more than 20 μm are used.

(2) Fabrication a Negative Electrode Plate

A raw material lead powder (a mixture of lead and lead oxide), water, dilute sulfic acid, and an expander such as natural lignin (VANILLEX N manufactured by Nippon paper Chemicals) and barium sulfate were kneaded in a weight ratio of 100:15:3.5:2.5:2.5 to obtain a negative electrode paste.

The negative electrode plate 2 shown in FIG. 2 was made as in the following, using the above negative electrode paste.
(A) In the Case of Negative Electrode Grid Body with No Sb Added The base material sheet comprising a Pb alloy containing 0.07% by mass of Ca and 0.25% by mass of Sn obtained by casting was pressed to have a thickness of 0.7 mm. After predetermined slits were formed on the base material sheet 27, the slits were expanded to form an expanded mesh 25 (FIG. 4(*a*)), to obtain an expanded grid body (expansion process). A center part of the base material sheet 27 was not expanded, since the part is to be used for forming a tab 22 and a frame 26 of the negative electrode grid mentioned later.

Figure 4:
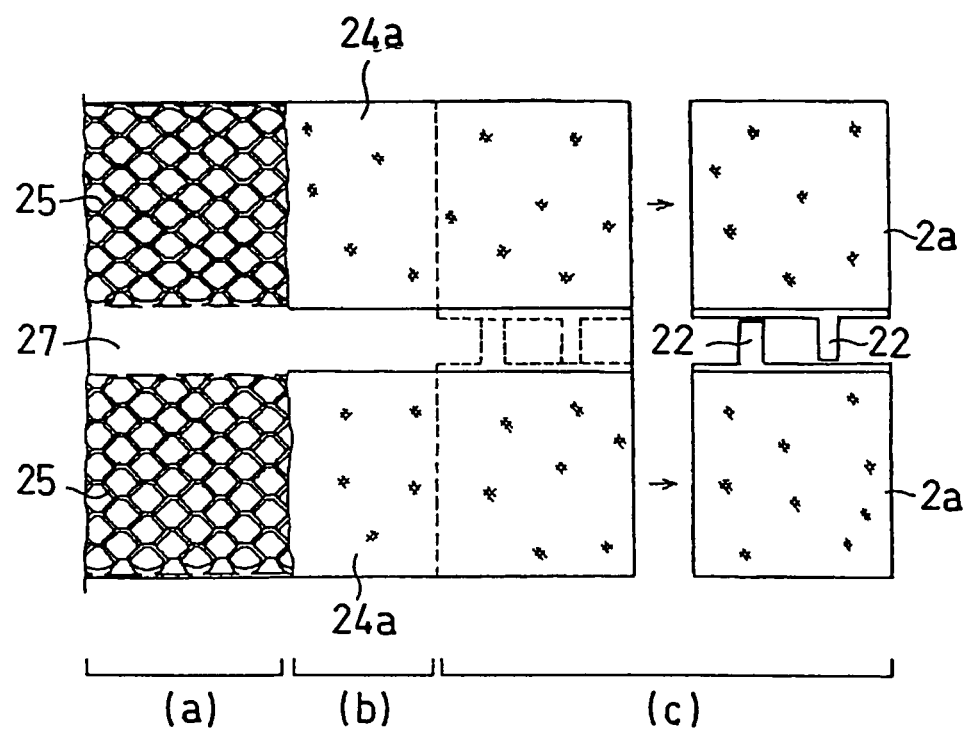
FIG. 4 An illustration of a step of expanding a base material sheet.
Figure 5:
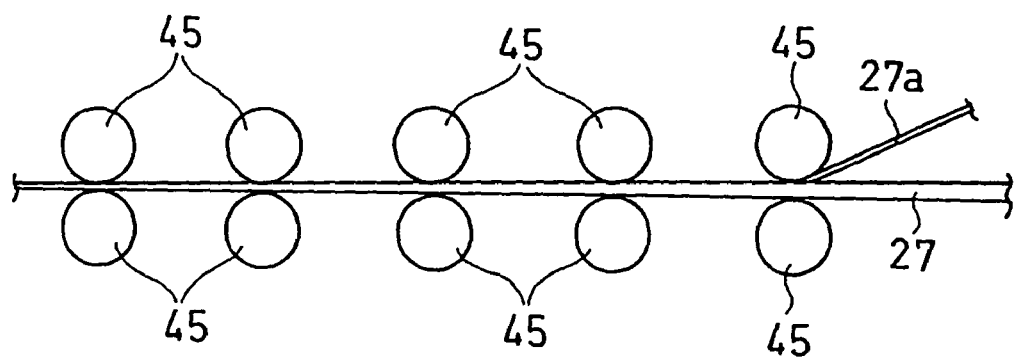
FIG. 5 An illustration of a step of obtaining a composite sheet used for producing a grid body.

A negative electrode paste 24*a* was filled into the expanded grid 25 (FIG. 4(*b*)), and was cut and formed to have an electrode plate shape having the tab 22 of negative electrode grid (FIG. 4(*c*)). The expanded grid retaining the negative electrode paste was cured and dried, to obtain an unformed negative electrode plate 2*a* (length: 115 mm, width: 137.5 mm). Then, the unformed negative electrode plate 2*a* was formed in a battery container, mentioned later, to obtain the negative electrode plate 2 comprising the negative electrode grid 21 retaining the negative electrode active material layer 24.
(B) In the Case of Negative Electrode Grid Body with Sb Added As shown in FIG. 5, a lead alloy foil 27*a* was supplied with a base material sheet 27 in between a pair of rollers 45, and the base material sheet 27 and the lead alloy foil 27*a* were simultaneously pressed, in a pressing step of a negative electrode grid fabrication. By this pressing process, the lead alloy foil 27*a* was attached onto the base material sheet 27, and a composite sheet having a lead alloy layer on one side of a base material sheet with a thickness of 0.7 mm was obtained. A Pb alloy containing 1.0% by mass of Sb was used for the lead alloy foil 27*a*.

For the part of the base material sheet 27 where the lead alloy foil 27*a* was to be pressed onto, only a part where an expanded mesh and a frame were to be formed in an expanding process mentioned later was pressed, and the lead alloy foil was not pressed onto a center part of the base material sheet 27 where a tab 22 of positive electrode grid is to be formed, as shown in FIG. 4.

Figure 6:
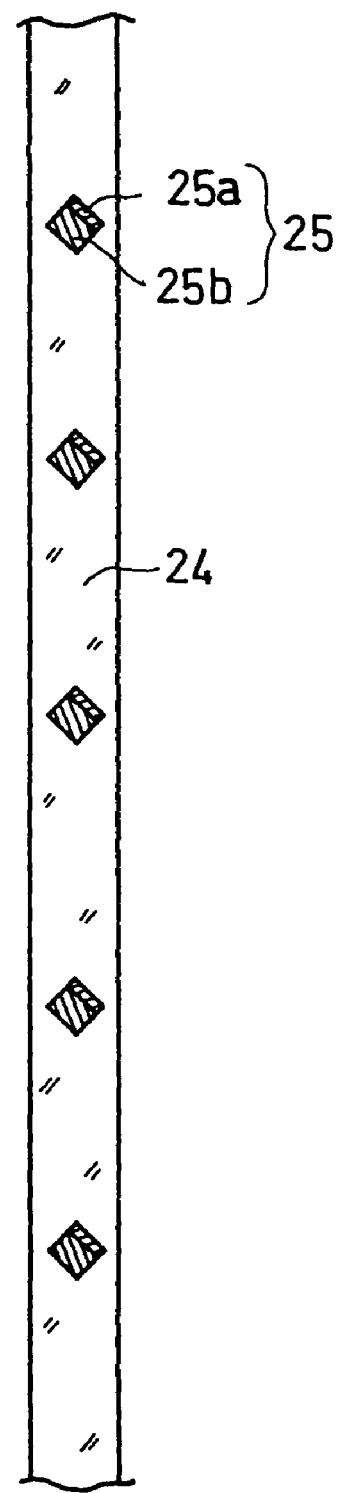
FIG. 6 A longitudinal sectional view showing a portion of a negative electrode plate using a negative electrode grid body having a lead alloy layer on a part of a surface thereof.

A negative electrode plate 2 was obtained in the same manner as above, except that an expansion process was conducted for the composite sheet. In this negative electrode plate, the expanded mesh 25 having rhombic cross sections comprises the base material layer 25*b* comprising Pb alloy containing 0.07% by mass of Ca and 0.25% by mass of Sn, and the lead alloy layer 25*a* comprising a Pb alloy containing 1.0% by mass of Sb on a surface of the base material sheet 25*a*, as shown FIG. 6.
(3) Fabrication of a Positive Electrode Plate A positive electrode plate 3 shown in FIG. 3 was made as in the following.

A raw material lead powder (a mixture of lead and lead oxide), water, and a dilute sulfic acid were mixed and kneaded in a weight ratio of 100:15:5, to obtain a positive electrode paste.

Then, a base material sheet comprising a Pb alloy containing 0.07% by mass of Ca and 1.3% by mass of Sn obtained by casting was pressed to have a thickness of 1.1 mm, and expanded in the same manner as the above. The expanded mesh was filled with a positive electrode paste, and an unformed positive electrode plate (length: 115 mm, width: 137.5 mm) was obtained in the same manner as in the above. Then, the unformed positive electrode plate was formed in a battery container, mentioned later, to obtain the positive electrode plate 3 comprising the positive electrode grid 31 retaining the positive electrode active material layer 34.

As a result of quantitative analysis for Sb amounts in the positive electrode grid, the positive electrode active material, the negative electrode active material, and the base material used for the negative electrode grid, it was found that the concentrations of Sb were below the detection limit (0.0001% by mass) in any of the results.
(4) Fabrication of Lead Storage Battery A lead storage battery 1 with a structure shown in FIG. 1 was made by the following method. FIG. 1 is a partially cut away perspective view of a lead storage battery.

Six pieces of the negative electrode plate 2 obtained in the above were respectively stored in the bag-shaped separator 4. The separators 4 storing the negative electrode plate 3 were alternately stacked with 5 pieces of the positive electrode plates 3, i.e., the positive electrode plate 3 and the negative electrode plate 2 were stacked interposing the separator 4 in between, to obtain an electrode plate pack 11. Subsequently, the homopolar tabs 22 and the homopolar tabs 32 were respectively welded, to obtain a positive electrode strap 6 and a negative electrode strap 5. Each of the electrode plate packs 11 was stored in six cell chambers 14 partitioned by partition 13 in the battery container 12. Adjacent electrode plate packs were connected in series by connecting a positive electrode connecting body 8 connected to the positive electrode strap 6 with a negative electrode connecting body connected to a negative electrode strap. In this example, the connections between the electrode plate packs were made by through holes (not shown) provided at the partitions 13.

In the electrode plate packs stored in cell chambers 14 positioned at both ends, a positive electrode pole was formed on the positive electrode strap in one electrode plate pack, and a negative electrode pole 7 was formed on the negative electrode strap 5 in other electrode plate pack. Then, a lid 15 was attached to an opening of the battery container 12, while a positive electrode terminal 16 and a negative electrode terminal 17 provided on the lid 15 were welded with the positive electrode pole and the negative electrode pole 7. Subsequently, 700 ml of sulfuric acid with a concentration of 34% by mass, as an electrolyte, was pored in each cell from a liquid inlet provided on the lid 15, and a formation was conducted in the battery container. After the formation, vent caps 18 having vent holes for ejecting a gas generated inside the battery to the outside were fixed into the liquid inlet, to obtain a lead storage battery of 55D23 type (12V-48 Ah) (hereinafter referred to as a battery) specified in JIS D5301. After the formation, the electrode plate packs 11, the positive electrode strap 6, and the negative electrode strap 5 were entirely immersed in the electrolyte.

In fabrication of the separator above, the contents of silica particles in the bag-shaped separator comprising a polyethylene sheet including silica particles was made to become 0% by mass, 35% by mass, 40% by mass, 65% by mass, or 85% by mass.

In producing the composite sheet in the negative electrode grid above, thicknesses of the lead alloy foil to be attached onto the base material layer were changed variously, so that Sb content in the negative electrode grid was 0.0002% by mass, 0.0004% by mass, 0.006% by mass, 0.007% by mass per 100 parts by mass of the negative electrode active material. The thickness of the lead alloy layer thus obtained was 0.46 μm, 0.92 μm, 13.8 μm, and 16.2 μm, respectively.

For the positive electrode connecting member and the negative electrode connecting member, a Pb alloy containing 2.5% by mass of Sn, or a Pb alloy containing 2.5% by mass of Sb was used. As a result of a quantitative analysis for the amount of Sb, the Sb content in the Pb alloy containing 2.5% by mass of Sn was below the detection limit (0.0001% by mass).

Then, as shown in Tables 1 and 2, the separators comprising polyethylene sheet including different amounts of silica particles, the positive and negative electrode members with different compositions, and the negative electrode plate having negative electrode grid with different amount of Sb content were used in various combinations to make batteries A1 to A5, B1 to B5, C1 to C5, D1 to D5, E1 to E5, F1 to F5, G1 to G5, H1 to H5, I1 to I5, and J1 to J5.

In Table 1, the batteries B2 to B5, C2 to C5, D2 to D5, and E2 to E5 are the batteries of Examples. Other batteries in Table 1 and the batteries in Table 2 are the batteries of Comparative Examples. Table 1 shows the case where a Pb alloy containing 2.5% by mass of Sn was used for the positive and negative electrode connecting members in the batteries, and Table 2 shows the case where a Pb alloy containing 2.5% by mass of Sb was used for the positive and negative electrode connecting members in the batteries.

TABLE 1

| Battery No. | Silica Content in Separator (% by mass) | Sb Content in Negative Electrode Grid (parts by mass) | Corrosion Rate of Negative Electrode Grid (%) | No. of Cycles (Cycle Life) |
|---|---|---|---|---|
| A1 | 0 | 0(<0.0001) | 2.0 | 21500 |
| A2 | 0 | 0.0002 | 80.2 | 22600 |
| A3 | 0 | 0.0004 | 80.6 | 23700 |
| A4 | 0 | 0.006 | 82.5 | 25100 |
| A5 | 0 | 0.007 | 81.2 | 27500 |
| B1 | 35 | 0(<0.0001) | 2.1 | 20900 |
| B2 | 35 | 0.0002 | 2.5 | 38500 |
| B3 | 35 | 0.0004 | 2.9 | 67200 |
| B4 | 35 | 0.006 | 3.4 | 75200 |
| B5 | 35 | 0.007 | 8.6 | 65400 |
| C1 | 40 | 0(<0.0001) | 2.1 | 26200 |
| C2 | 40 | 0.0002 | 2.3 | 44200 |
| C3 | 40 | 0.0004 | 2.8 | 104600 |
| C4 | 40 | 0.006 | 3.2 | 105200 |
| C5 | 40 | 0.007 | 7.6 | 79300 |
| D1 | 65 | 0(<0.0001) | 2.0 | 26500 |
| D2 | 65 | 0.0002 | 2.2 | 44700 |
| D3 | 65 | 0.0004 | 2.4 | 109500 |
| D4 | 65 | 0.006 | 2.5 | 111200 |
| D5 | 65 | 0.007 | 8.2 | 103500 |
| E1 | 85 | 0(<0.0001) | 1.9 | 22400 |
| E2 | 85 | 0.0002 | 2.0 | 46800 |
| E3 | 85 | 0.0004 | 2.2 | 101200 |
| E4 | 85 | 0.006 | 2.3 | 102900 |
| E5 | 85 | 0.007 | 8.1 | 95400 |

TABLE 2

| Battery No. | Silica Content in Separator (% by mass) | Sb Content in Negative Electrode Grid (parts by mass) | Corrosion Rate of Negative Electrode Grid (%) | No. of Cycles (Cycle Life) |
|---|---|---|---|---|
| F1 | 0 | 0(<0.0001) | 84.1 | 22400 |
| F2 | 0 | 0.0002 | 84.5 | 22300 |
| F3 | 0 | 0.0004 | 85.8 | 21000 |
| F4 | 0 | 0.006 | 88.2 | 21200 |
| F5 | 0 | 0.007 | 87.2 | 20400 |
| G1 | 35 | 0(<0.0001) | 81.3 | 23900 |
| G2 | 35 | 0.0002 | 82.3 | 21700 |
| G3 | 35 | 0.0004 | 82.7 | 21800 |
| G4 | 35 | 0.006 | 83.9 | 21500 |
| G5 | 35 | 0.007 | 87.3 | 21500 |
| H1 | 40 | 0(<0.0001) | 78.0 | 24400 |
| H2 | 40 | 0.0002 | 78.5 | 24500 |
| H3 | 40 | 0.0004 | 79.1 | 25200 |
| H4 | 40 | 0.006 | 80.2 | 25000 |
| H5 | 40 | 0.007 | 80.9 | 25900 |
| I1 | 65 | 0(<0.0001) | 79.3 | 26800 |
| I2 | 65 | 0.0002 | 80.2 | 25406 |
| I3 | 65 | 0.0004 | 81.8 | 25200 |
| I4 | 65 | 0.006 | 83.3 | 25000 |
| I5 | 65 | 0.007 | 85.1 | 26800 |
| J1 | 85 | 0(<0.0001) | 75.9 | 25500 |
| J2 | 85 | 0.0002 | 76.5 | 27400 |
| J3 | 85 | 0.0004 | 81.3 | 25900 |
| J4 | 85 | 0.006 | 82.2 | 27000 |
| J5 | 85 | 0.007 | 82.6 | 28100 |

As a result of quantitative analysis for Sb amounts in the positive electrode grid, the positive electrode active material layer, and the negative electrode grid, it was found that the amounts of Sb were below the detection limit (0.0001% by mass) in any of the results.

The evaluations shown below were conducted for each battery thus obtained.

(5) Evaluations for Cycle Life Property After Over-Discharge

A battery was discharged at a current of 10A until a battery voltage became 10.5V under 25° C. ambient temperature. Subsequently, the battery was stood still for 48 hours with a 12-watt bulb being connected in between the terminals, to over-discharge the battery. Then, the battery was charged for 8 hours at a constant current of 14.5V (maximum current 25 A).

Next, a cycle life test was conducted under the following conditions for the batteries after the over-discharge.

The weights of the batteries were measured before the cycle life test. A step of discharging the battery for 20 seconds at a current of 25 A under 25° C. ambient temperature, and then charging for 40 seconds at a constant voltage of 14V (maximum charging current 25 A) was repeated 7200 times for charge/discharge cycles. Afterwards, the battery weight was measured again, and the amount of weight loss (WL) before and after the charge/discharge cycle was obtained. Then, the battery was discharged for 30 seconds at a current of 300 A. A discharging voltage at the 30$^{th}$ second (hereinafter shown as V30) was obtained, and then water was supplemented in an amount of the weight loss of the battery.

V30 was obtained at every 7200th cycle, and the end of the service life of the battery was set to when V30 was reduced to 7.0V. Usually, in a lead storage battery for starting an engine, a light-load service life test is conducted, in which a step of discharging the battery for 4 minutes at a current of 25 A, and then charging for 10 minutes at a constant voltage (maximum current 25 A) was repeated (specified in JIS D5301). However, in this cycle life test, the test conditions were set by assuming a frequent charge/discharge at lower SOC compared with usual light-load service life test.

The number of cycles of the battery life was obtained in the following method. When V30 obtained in $n^{th}$ time (a number of charge/discharge cycle was obtained by 7200×n) became 7.0V or less for the first time, the V30 is set as Vn, and V30 obtained in the previous $(n-1)^{th}$ time was set as Vn−1. Then, in a graph setting a vertical axis as V30, and a horizontal axis as a number of charge/discharge cycle, coordinates (7200(n−1), Vn−1) and coordinates (7200 n, Vn) were connected with a liner line, and the value of the horizontal axis at a point of intersection of this line and V30=7.0 was made the number of cycles (cycle life).

(6) Measurement of Corrosion Rate of Tab of Negative Electrode Grid

The batteries completed the life test were disassembled, and corrosion rate of the tab of negative electrode grid was obtained by measuring the thickness of the thinnest part of the tab of negative electrode grid. The thickness of the thinnest part of the tab of negative electrode grid was obtained by cutting a center part in the widthwise direction, and measuring a thinnest part with a microscope. Then, corrosion rate (%) of the tab of negative electrode grid was calculated with a formula (T−TE)/T×100, by setting the thickness of the tab of negative electrode grid in the original state as T, and setting the thickness of the tab of negative electrode grid after the life test as TE.

The results of the test are shown in Tables 1 and 2.

As shown in table 2, when a Pb alloy containing 2.5% by mass of Sb was used, in any of the batteries, corrosion rate of the tab of negative electrode grid was high and the number of cycles (cycle life) was 20000 to 30000 cycles. This is probably because Sb included in the positive and negative electrode connecting members is dissolved into the electrolyte, and the dissolved Sb is deposited to the tab of negative electrode grid. These batteries were disassembled, and as a result of the quantitative analysis for Sb, it was found that approximately 0.0006% by mass of Sb existed in the tab of negative electrode grid.

As shown in Table 1, in batteries B2 to B5, C2 to C5, D2 to D5, and E2 to E5 of the present invention, in which the positive and negative electrode connecting members comprising a Pb alloy containing 2.5% by mass of Sn, the negative electrode grid including Sb at a part thereof excluding the tab, and the separator comprising the polyethylene sheet including silica particles were used, corrosion rate of the tab of negative electrode grid decreased, and the number of the cycles (cycle life) was increased, compared with the batteries A1 to A5, B1, C1, D1, and E1 of Comparative Examples.

The improvement in the cycle life properties were probably based on an improvement of chargeability of negative electrode plate by the inclusion of Sb in the negative electrode grid excluding the tab part. Also, although these batteries were disassembled and as a result of the quantitative analysis for Sb in the tab of negative electrode grid, Sb over the detection limit (0.0001% by mass) was not detected from the tab of negative electrode grid.

The corrosion of the tab of negative electrode grid was probably suppressed because Sb ion dissolved into the electrolyte was captured by silica particles included in the separator, thereby suppressing a diffusion of Sb ion to the proximity of the tab of negative electrode grid, and suppressing a deposition of Sb to the tab of negative electrode grid.

Since Sb ion adsorbed on a surface of the silica deposits on a surface of the negative electrode active material in proximity of the separator while charging the battery, the effect of the improvement of the chargeability can be continuously obtained by including Sb in the negative electrode plate.

In the batteries A2 to A5 of Comparative Example using the separator not including silica particles, and the negative electrode grid including Sb in a part thereof excluding the tab, the number of cycles (cycle life) was below 30000 cycles, because corrosion rate of the tab of negative electrode grid significantly increased by an advancement of the corrosion of the tab of negative electrode grid, and current collecting properties of the negative electrode plate declined. This is probably because Sb dissolved from the lead alloy layer formed on a surface of the negative electrode grid excluding the tab part due to over-discharge before the battery life test was deposited to the tab of negative electrode grid, and with the repeated charge/discharge, corrosion of the tab of negative electrode grid was advanced by Sb deposited to the tab of negative electrode grid.

In the batteries B1, C1, D1, and E1 of Comparative Example using the separator including silica particles, and the negative electrode grid not including Sb, while corrosion of the tab of negative electrode grid was barely advanced, the service life properties were declined. Upon disassembling the batteries which completed the battery life test, it was found that a lead sulfate produced by a discharge was accumulated. Thus, it was confirmed that the cause for the battery to reach its life limit was the decline of chargeability.

When Sb content in the negative electrode grid excluding the tab part was not less than 0.0002 parts by mass per 100 parts by mass of the negative electrode active material, the service life properties were improved. And when Sb content in the negative electrode grid excluding the tab part was not less than 0.0004 parts by mass per 100 parts by mass of the negative electrode active material, the service life properties improved significantly. However, when Sb content in the negative electrode grid excluding the tab part was 0.007 parts by mass per 100 parts by mass of the negative electrode active material, the corrosion rate of the tab of negative electrode grid was increased. From the above, it can be concluded that Sb content in the negative electrode grid excluding the tab part is preferably 0.0004 to 0.006 parts by mass per 100 parts by mass of the negative electrode active material.

When the silica particles content in the separator comprising polyethylene sheet including silica particles is not less than 35% by mass, service life properties were improved, and corrosion of the tab of negative electrode grid was suppressed. Especially, when the silica particles content in the separator comprising polyethylene sheet including silica particles is 40 to 85% by mass, significant improvement in service life properties and in suppression of corrosion of the tab of negative electrode grid was achieved. When the silica particles content in the separator comprising polyethylene sheet including silica particles is over 85% by mass, although the above effect was obtained, the separator intensity declined, and handling properties during manufacturing steps became inferior. From the above, it can be concluded that the silica particles content in the separator comprising polyethylene sheet including silica particles is preferably 40 to 85% by mass.

Example 2

A glass fiber mat with a thickness of 1.0 mm retaining silica particles was obtained by paper-making process of a glass fiber in an acidic aqueous solution in which silica particles were dispersed. Then, the obtained glass fiber mat was folded to two, and a bag-shaped separator with an opening only on top was made by welding a left end part and a right end part by heating. At this time, the silica particle content in the separator comprising the glass fiber mat retaining silica particles was set to become 0% by mass, 5% by mass, 10% by mass, 40% by mass, and 50% by mass. For the silica particles, the same silica particles as in Example 1 were used.

As shown in Tables 3 and 4, batteries K1 to K5, L1 to L5, M1 to M5, N1 to N5, O1 to O5, P1 to P5, Q1 to Q5, R1 to R5, S1 to S5, and T1 to T5 were made in the same manner as in Example 1, by combining separators comprising glass fiber mat retaining silica particles with different silica particle contents, negative active material layer with different amounts of Sb content, and positive and negative electrode connecting members with different alloy compositions.

The batteries L2 to L5, M2 to M5, N2 to N5, and O2 to O5 in Table 3 are the batteries of Examples, and other batteries in Table 3 and the batteries in Table 4 are the batteries of Comparative Examples. The batteries in Table 3 show a case where a Pb alloy containing 2.5% by mass of Sn was used for positive and negative electrode connecting members, and the batteries in Table 4 show a case where a Pb alloy containing 2.5% by mass of Sb was used for positive and negative electrode connecting members.

TABLE 3

| Battery No. | Silica Content in Separator (% by mass) | Sb Content in Negative Electrode Grid (parts by mass) | Corrosion Rate of Negative Electrode Grid (%) | No. of Cycles (Cycle Life) |
| --- | --- | --- | --- | --- |
| K1 | 0 | 0(<0.0001) | 2.0 | 19500 |
| K2 | 0 | 0.0002 | 80.6 | 18700 |
| K3 | 0 | 0.0004 | 79.5 | 20800 |
| K4 | 0 | 0.006 | 80.2 | 21200 |
| K5 | 0 | 0.007 | 79.6 | 22400 |
| L1 | 5 | 0(<0.0001) | 2.0 | 19600 |
| L2 | 5 | 0.0002 | 2.1 | 53200 |
| L3 | 5 | 0.0004 | 2.2 | 73800 |
| L4 | 5 | 0.006 | 2.8 | 83400 |
| L5 | 5 | 0.007 | 8.2 | 69800 |
| M1 | 10 | 0(<0.0001) | 2.0 | 20200 |
| M2 | 10 | 0.0002 | 2.1 | 87800 |
| M3 | 10 | 0.0004 | 2.1 | 99200 |
| M4 | 10 | 0.006 | 2.2 | 108400 |

TABLE 3-continued

| Battery No. | Silica Content in Separator (% by mass) | Sb Content in Negative Electrode Grid (parts by mass) | Corrosion Rate of Negative Electrode Grid (%) | No. of Cycles (Cycle Life) |
| --- | --- | --- | --- | --- |
| M5 | 10 | 0.007 | 7.8 | 92400 |
| N1 | 40 | 0(<0.0001) | 2.0 | 23200 |
| N2 | 40 | 0.0002 | 2.0 | 110800 |
| N3 | 40 | 0.0004 | 2.1 | 124500 |
| N4 | 40 | 0.006 | 2.5 | 126000 |
| N5 | 40 | 0.007 | 7.1 | 116200 |
| O1 | 50 | 0(<0.0001) | 1.9 | 16500 |
| O2 | 50 | 0.0002 | 2.0 | 62900 |
| O3 | 50 | 0.0004 | 2.0 | 106300 |
| O4 | 50 | 0.006 | 2.1 | 105400 |
| O5 | 50 | 0.007 | 7.0 | 81600 |

TABLE 4

| Battery No. | Silica Content in Separator (% by mass) | Sb Content in Negative Electrode Grid (parts by mass) | Corrosion Rate of Negative Electrode Grid (%) | No. of Cycles (Cycle Life) |
| --- | --- | --- | --- | --- |
| P1 | 0 | 0(<0.0001) | 81.2 | 25100 |
| P2 | 0 | 0.0002 | 82.3 | 23500 |
| P3 | 0 | 0.0004 | 83.1 | 20100 |
| P4 | 0 | 0.006 | 84.2 | 21800 |
| P5 | 0 | 0.007 | 84.6 | 21300 |
| Q1 | 5 | 0(<0.0001) | 77.6 | 22800 |
| Q2 | 5 | 0.0002 | 78.5 | 22200 |
| Q3 | 5 | 0.0004 | 78.6 | 20530 |
| Q4 | 5 | 0.006 | 79.2 | 21500 |
| Q5 | 5 | 0.007 | 81.5 | 21850 |
| R1 | 10 | 0(<0.0001) | 78.2 | 23400 |
| R2 | 10 | 0.0002 | 82.1 | 24200 |
| R3 | 10 | 0.0004 | 83.4 | 25200 |
| R4 | 10 | 0.006 | 83.6 | 24700 |
| R5 | 10 | 0.007 | 84.0 | 24600 |
| S1 | 40 | 0(<0.0001) | 81.2 | 25200 |
| S2 | 40 | 0.0002 | 82.1 | 25600 |
| S3 | 40 | 0.0004 | 82.5 | 25500 |
| S4 | 40 | 0.006 | 84.0 | 24600 |
| S5 | 40 | 0.007 | 80.5 | 26400 |
| T1 | 50 | 0(<0.0001) | 82.2 | 27300 |
| T2 | 50 | 0.0002 | 83.8 | 27600 |
| T3 | 50 | 0.0004 | 85.0 | 27700 |
| T4 | 50 | 0.006 | 84.5 | 28000 |
| T5 | 50 | 0.007 | 83.5 | 27800 |

For each battery, the cycle life test after over-charging was conducted and a corrosion rate of the tab of negative electrode grid was measured under the same test conditions with Example 1. The results of these tests are shown in Tables 3 and 4.

As shown in Table 4, when a Pb alloy containing 2.5% by mass of Sb was used for the positive and negative electrode connecting members, the corrosion rate of the tab of negative electrode grid was high, and the number of cycles (cycle life) was about below 30000 cycles, and corrosion of the tab of negative electrode grid advanced in any battery. This is probably because Sb included in positive and negative electrode connecting members dissolved in the electrolyte, and the dissolved Sb deposited on the tab of negative electrode grid, as in Example 1. Upon disassembling these batteries, and conducting a quantitative analysis for Sb at the tab of negative electrode grid, it was found that about 0.0005% by mass of Sb was found at the tab of negative electrode grid.

As shown in Table 3, in the batteries L2 to L5, M2 to M5, N2 to N5, and O2 to O5 of the present invention using the positive and negative electrode connecting members comprising the Pb alloy containing 2.5% by mass of Sn, the negative electrode grid including Sb except for the tab part, and the separator comprising glass fiber mat retaining silica particles, the corrosion rate of the tab of negative electrode grid decreased, and a number of cycles (cycle life) was increased, compared with the batteries K1 to K5, L1, M1, N1, and O1 of the Comparative Examples. Upon disassembling these batteries, and conducting a quantitative analysis for Sb at the tab of negative electrode grid, it was found that Sb over the detection limit (0.0001% by mass) was not found at the tab of negative electrode grid.

In the batteries K2 to K5 of Comparative Examples using the separator not including the silica particles, and the negative electrode grid including Sb except for the tab part, a number of cycles (cycle life) was below 30000, based on a significant increase in the corrosion rate of the tab of negative electrode grid due to advancement of corrosion of the tab of negative electrode grid, and decline in current collecting properties of the negative electrode plate.

In the batteries L1, M1, N1, and O1 of Comparative Example using the separator including silica particles, and negative electrode grid not including Sb, although corrosion of the tab of negative electrode grid barely advanced, service life properties declined due to decline in chargeability.

When the silica particle content in the separator comprising a glass fiber mat retaining silica particles is not less than 5% by mass, service life properties improved, and corrosion of the tab of negative electrode grid was suppressed. Especially, when the silica particle content in the separator comprising a glass fiber mat retaining silica particles was 10 to 40% by mass, effects of an improvement of service life properties, and suppression of corrosion of the tab of negative electrode grid were achieved significantly. In a battery with 50% by mass silica particle content in the separator comprising a glass fiber mat retaining silica particles, a number of cycles (cycle life) slightly decreased. From the above, it can be concluded that silica particle content in the separator comprising glass fiber mat retaining silica particles is preferably 10 to 40% by mass.

When Sb content in the negative electrode grid excluding the tab part was not less than 0.0002 parts by mass per 100 parts by mass of the negative electrode active material, service life properties improved. Especially, when Sb content in the negative electrode grid excluding the tab part was not less than 0.0004 per 100 parts by mass of the negative electrode active material, service life properties improved significantly. However, when Sb content in the negative electrode grid excluding the tab part was 0.007 parts by mass per 100 parts by mass of the negative electrode active material, corrosion rate of the tab of negative electrode grid increased. From the above, it can be concluded that Sb content in the negative electrode excluding the tab part is preferably 0.0004 to 0.006 parts by mass per 100 parts by mass of the negative electrode active material.

In comparison with the batteries of the present invention using the separator comprising the polyethylene sheet including the silica particles in Example 1, the batteries of the present invention using the separator comprising the glass fiber mat retaining silica particles in Example 2 achieved more effects to suppress the corrosion of the tab of negative electrode grid even with a small amount of silica particles.

The following can be guessed. In the separator comprising a polyethylene sheet including silica particles, silica particles are dispersed in the polyethylene sheet. Therefore, much parts of the silica particles are covered by polyethylene, and Sb ion can not be adsorbed by such covered part. On the other hand, in the separator comprising glass fiber mat retaining silica particles, silica particles are dispersed on a surface of the fiber. Therefore, Sb ion can be adsorbed by much part of the surface of the silica particles.

Example 3

By the same method as the negative electrode grid in Example 1, in the pressing step of in producing the positive electrode grid, a lead alloy foil was pressed to attach onto a base material sheet to obtain a composite sheet having a lead alloy layer with a thickness of 20 μm on one side of a base material layer with a thickness of 1.1 mm. A Pb alloy containing 5.0% by mass of Sn was used for the lead alloy foil. The same positive electrode grid as in Example 1 was used for the base material sheet.

For the part of the base material sheet where the lead alloy foil is to be pressed onto, only a part where an expanded mesh and a frame are to be formed in the expanding process mentioned later was pressed, and the lead alloy foil was not pressed onto a center part of the base material sheet where a tab of positive electrode grid is to be formed, as shown in Example 1.

A positive electrode plate was obtained in the same manner as in Example 1, except that an expansion process was conducted for the composite sheet. In this positive electrode plate, a base material layer of an expanded mesh 25 having a rhombic cross section as shown FIG. 6 comprised a Pb alloy containing 0.07% by mass of Ca and 1.3% by mass of Sn, and a lead alloy layer 25a comprising a Pb alloy containing 5% by mass of Sn.

A battery C8 having the same structure with C3 was made except that the positive electrode plate obtained above was used.

A battery C7 having the same structure with C8 was made except that the bag-shaped separator stored the positive electrode plate instead of the negative electrode plate.

A battery C6 having the same structure with C3 was made except that the bag-shape separator stored the positive electrode plate instead of the negative electrode plate.

Batteries M6 to M8 having the same structure with the batteries C6 to C8 were respectively made except that the separator comprising the glass fiber mat retaining the silica particles of the battery M3 was used instead of the separator comprising polyethylene sheet including silica particles of the battery C3.

The test results are shown in Table 5.

TABLE 5

| Battery No. | Separator Containing Silica | | Lead Alloy Layer including Sn in Positive Electrode Grid | Corrosion Rate of Negative Electrode Grid (%) | No. of Cycles (Cycle Life) |
|---|---|---|---|---|---|
| | Separator Material | Stored Electrode Plate | | | |
| C6 | Polyethylene | Positive Electrode Plate | No | 4.1 | 99400 |
| C7 | Polyethylene | Positive Electrode Plate | Yes | 3.9 | 165000 |
| C3 | Polyethylene | Negative Electrode Plate | No | 2.8 | 104600 |
| C8 | Polyethylene | Negative Electrode Plate | Yes | 2.7 | 173000 |
| M6 | Glass Fiber | Positive Electrode Plate | No | 3.8 | 93200 |
| M7 | Glass Fiber | Positive Electrode Plate | Yes | 3.2 | 123600 |
| M3 | Glass Fiber | Negative Electrode Plate | No | 2.1 | 99200 |
| M8 | Glass Fiber | Negative Electrode Plate | Yes | 2.0 | 145200 |

When there is a lead alloy layer including Sn on a part of the surface of the positive electrode grid, a formation of a passivated layer at an interface of the positive electrode grid and the active material was suppressed, thereby improving chargeability of the positive electrode plate, and increasing the number of cycles (cycle life).

Also, since diffusion of Sb are more suppressed when the negative electrode plate was stored in the bag-shaped separator instead of the positive electrode plate, corrosion rate of the tab of negative electrode grid due to deposition of Sb to the tab of negative electrode grid was low.

Example 4

A lead alloy foil was pressed to attach onto a base material sheet, so that a negative electrode grid had a lead alloy layer including Sb in an upper part (a width $W_1$ in FIG. 2), a middle part (a width $W_2$ in FIG. 2), and a lower part (a width $W_3$ in FIG. 2) regions of a negative electrode plate. The $W_1$, $W_2$, and $W_3$ had the same width, and each has a ⅓ of a height of the negative electrode grid excluding the tab.

The composite sheets were made in the same manner as in Example 1 except for the above. Batteries C9 to C11 having the same structure with the battery C3 were made by using these composite sheets for materials for a negative electrode grid. Also, batteries M9 to M11 having the same structure with the battery M3 were made by using these composite sheets for the materials for a negative electrode grid. The test results of the batteries are shown in Table 6.

From Table 6, it became clear that service life properties change depending on a position where the lead alloy layer including Sb is formed. When the negative electrode grid has the lead alloy layer including Sb on a lower region of the negative electrode plate, the same service life properties with the case when the negative electrode grid has the lead alloy layer including Sb in the entire part of the negative electrode plate excluding the tab part were obtained. When the negative electrode grid has the lead alloy layer including Sb in a lower region of the negative electrode plate, generation of hydrogen gas becomes significant in the lower part of the electrode plate, and electrolyte is stirred by the generated hydrogen gas, thereby suppressing decline in service life properties due to stratification of the electrolyte. Also, since the lead alloy layer including Sb needs to be provided only at a lower part of the negative electrode plate, material costs can be reduced, and manufacturing cost of a battery can be decreased.

INDUSTRIAL APPLICABILITY

A lead storage battery of the present invention is suitably used for vehicles and the like which carry a stop-and-go-system, because of its excellent service life properties under a usage mode in which charge/discharge is repeated under a low SOC range.

The invention claimed is:
1. A lead storage battery including:
an electrode plate pack comprising a plurality of negative electrode plates which each comprise a negative elec-

TABLE 6

| Battery No. | Composing Material for Separator containing Silica | Region on Negative Electrode Plate Where Lead Alloy Layer Including Sb Is Formed | Corrosion Rate of Tab of Negative Electrode Grid (%) | No. of Cycles (Cycle Life) |
|---|---|---|---|---|
| C3 | Polyethylene | Entire Region Excluding Tab Part | 2.8 | 104600 |
| C9 | Polyethylene | Upper Part | 2.7 | 124300 |
| C10 | Polyethylene | Middle Part | 2.3 | 141500 |
| C11 | Polyethylene | Lower Part | 1.9 | 167200 |
| M3 | Glass Fiber | Entire Region Excluding Tab Part | 2.1 | 99200 |
| M9 | Glass Fiber | Upper Part | 2.1 | 116100 |
| M10 | Glass Fiber | Middle Part | 1.9 | 131100 |
| M11 | Glass Fiber | Lower Part | 1.7 | 154400 | trode grid having a tab and a negative electrode active material layer retained by said negative electrode grid, a plurality of positive electrode plates which each comprise a positive electrode grid having a tab and a positive electrode active material layer retained by said positive electrode grid, and a plurality of separators separating said positive electrode plate and said negative electrode plate;

a positive electrode connecting member comprising a positive electrode strap to which said tab of each positive electrode plate of the electrode plate pack is connected, and a positive electrode pole or a positive electrode connecting body provided at said positive electrode strap; and a negative electrode connecting member comprising a negative electrode strap to which said tab of each negative electrode plate of the electrode plate pack is connected, and a negative electrode pole or a negative electrode connecting body provided at said negative electrode strap, wherein said positive electrode grid, said negative electrode grid, said positive electrode connecting member, and said negative electrode connecting member comprise a Pb-alloy including at least one of Ca and Sn, said Pb-alloy in said positive electrode grid and said positive electrode connecting member does not include Sb, or contains Sb in an amount of 0.001 to 0.002% by mass as an impurity;

said Pb-alloy in said negative electrode grid and said negative electrode connecting member does not include Sb, or contains Sb in an amount of less than 0.0001% by mass as an impurity;

said separator comprises a microporous synthetic resin sheet and silica particles dispersed in said synthetic resin sheet, and includes 35 to 85% by mass of said silica particles;

wherein said negative electrode grid is divided into an upper part, a middle part and a lower part, such that the upper part is closest to the tab and the lower part is furthest from the tab, and a lead alloy layer including Sb, which includes 0.0002 to 0.006 parts by mass of said Sb per 100 parts by mass of the negative electrode active material, is attached only to the lower part of the negative electrode grid.

2. The lead storage battery in accordance with claim 1, wherein said positive electrode grid comprises a base material layer comprising Pb alloy including at least one of said Ca and Sn, and a lead alloy layer including Sn formed on at least a part of said base material layer.

3. The lead storage battery in accordance with claim 1, wherein said separator is shaped like a bag, and accommodates said negative electrode plate.

4. The lead storage battery in accordance with claim 1, wherein said separator includes 40 to 85% by mass of said silica particles.

5. The lead storage battery in accordance with claim 1, wherein said separator includes 40 to 65% by mass of said silica particles.

6. The lead storage battery in accordance with claim 1, wherein said part of said negative electrode grid excluding said tab includes 0.0004 to 0.006 parts by mass of said Sb per 100 parts by mass of the negative electrode active material.

7. A lead storage battery including:

an electrode plate pack comprising a plurality of negative electrode plates which each comprise a negative electrode grid having a tab and a negative electrode active material layer retained by said negative electrode grid, a plurality of positive electrode plates which each comprise a positive electrode grid having a tab and a positive electrode active material layer retained by said positive electrode grid, and a plurality of separators separating said positive electrode plate and said negative electrode plate;

a positive electrode connecting member comprising a positive electrode strap to which said tab of each positive electrode plate of the electrode plate pack is connected, and a positive electrode pole or a positive electrode connecting body provided at said positive electrode strap; and a negative electrode connecting member comprising a negative electrode strap to which said tab of each negative electrode plate of the electrode plate pack is connected, and a negative electrode pole or a negative electrode connecting body provided at said negative electrode strap, wherein said positive electrode grid, said negative electrode grid, said positive electrode connecting member, and said negative electrode connecting member comprise a Pb-alloy including at least one of Ca and Sn, said Pb-alloy in said positive electrode grid and said positive electrode connecting member does not include Sb, or contains Sb in an amount of 0.001 to 0.002% by mass as an impurity;

said Pb-alloy in said negative electrode grid and said negative electrode connecting member does not include Sb, or contains Sb in an amount of less than 0.0001% by mass as an impurity;

said separator comprises a fiber mat and silica particles retained by said fiber mat, and includes 5 to 50% by mass of said silica particles;

wherein said negative electrode grid is divided into an upper part, a middle part and a lower part, such that the upper part is closest to the tab and the lower part is furthest from the tab, and a lead alloy layer including Sb which includes 0.0002 to 0.006 parts by mass of said Sb per 100 parts by mass of the negative electrode active material is attached only to the lower part of the negative electrode grid.

8. The lead storage battery in accordance with claim 7, wherein said separator includes 10 to 50% by mass of said silica particles.

9. The lead storage battery in accordance with claim 7, wherein said separator includes 10 to 40% by mass of said silica particles.

10. The lead storage battery in accordance with claim 7, wherein said part of said negative electrode grid excluding said tab includes 0.0004 to 0.006 parts by mass of said Sb per 100 parts by mass of the negative electrode active material.

* * * * *